CIRCUITS FOR LOCATING A BINARY DIGIT WITHIN AN INTERVAL

Filed Aug. 21, 1956 4 Sheets-Sheet 1

INVENTOR.
THEODORE A. KALIN
BY Wade Koontz
ATTORNEY
Alfred L. Brody
AGENT

INVENTOR.
THEODORE A. KALIN
BY Wade Koontz
ATTORNEY
Alfred L. Brody
AGENT

March 24, 1959 T. A. KALIN 2,879,498

CIRCUITS FOR LOCATING A BINARY DIGIT WITHIN AN INTERVAL

Filed Aug. 21, 1956 4 Sheets-Sheet 3

INVENTOR.
THEODORE A. KALIN
BY Wade Koontz
ATTORNEY
and
Alfred L. Brody
AGENT

March 24, 1959 T. A. KALIN 2,879,498

CIRCUITS FOR LOCATING A BINARY DIGIT WITHIN AN INTERVAL

Filed Aug. 21, 1956 4 Sheets-Sheet 4

INVENTOR.
THEODORE A. KALIN
BY Wade Koontz
ATTORNEY and
Alfred L. Brody
AGENT

United States Patent Office 2,879,498

Patented Mar. 24, 1959

2,879,498

CIRCUITS FOR LOCATING A BINARY DIGIT WITHIN AN INTERVAL

Theodore A. Kalin, Waltham, Mass., assignor to the United States of America as represented by the Secretary of the Air Force Application August 21, 1956, Serial No. 605,451

2 Claims. (Cl. 340—149)

The invention described herein may be manufactured and used by or for the United States Government for governmental purposes without payment to me of any royalty thereon.

The subject invention relates to sensing the location of a binary number within an interval and more particularly to the perception of whether or not a given binary number lies between two predetermined binary numbers.

In the design of digital computers it is often necessary to know whether a given binary number X, is greater than another number A, or whether X is greater than or equal to A but less than or equal to a third number B. Generally, in the digital computers of the prior art, the magnitude of X with respect to A has been determined by subtracting the numbers and sensing the sign of the difference. If A is subtracted from X, and the difference is positive, X is greater than A and, conversely, if the difference is negative, X is less than A. Obviously, if the difference between A and X is zero, then A is equal to X. Such an operation in a digital machine requires a considerable amount of equipment, including storage devices, memory devices, programming equipment and an accumulator, to perform the necessary subtraction and sensing operations. A similar but more complex arithmetic method is used in the prior art computer equipment to determine if X lies between two predetermined binary numbers, A and B.

The present invention provides circuitry for determining whether X is greater than A, when X and A are both binary numbers, which circuitry utilizes the principles of logical algebra in a manner to substantially reduce the overall number of component parts of the system, as compared with prior art circuitry operating on principles based on arithmetic techniques.

One feature of the present invention is its more direct and less complex arrangement than known computers of the prior art.

Another feature of the present invention is its inherent adaptability for the insertion of additional binary digits into its circuitry.

Still another feature of the present invention is its direct method of locating a given binary number within an interval by use of the complements of the digits of said given binary number and/or the digits or complements of the digits of the binary numbers representative of the limits of said interval.

An additional feature of the present invention is the provision of means for locating the presence of a given binary number within an interval by the detection of the existence of a condition of equality, as between corresponding digits of two numbers, one representative of one limit of said interval and the other being said given number.

The novel features of the invention, as well as the invention itself, both as to its organization and method of operation, will best be understood from the following description when taken in connection with the drawings, wherein.

Figure 4:
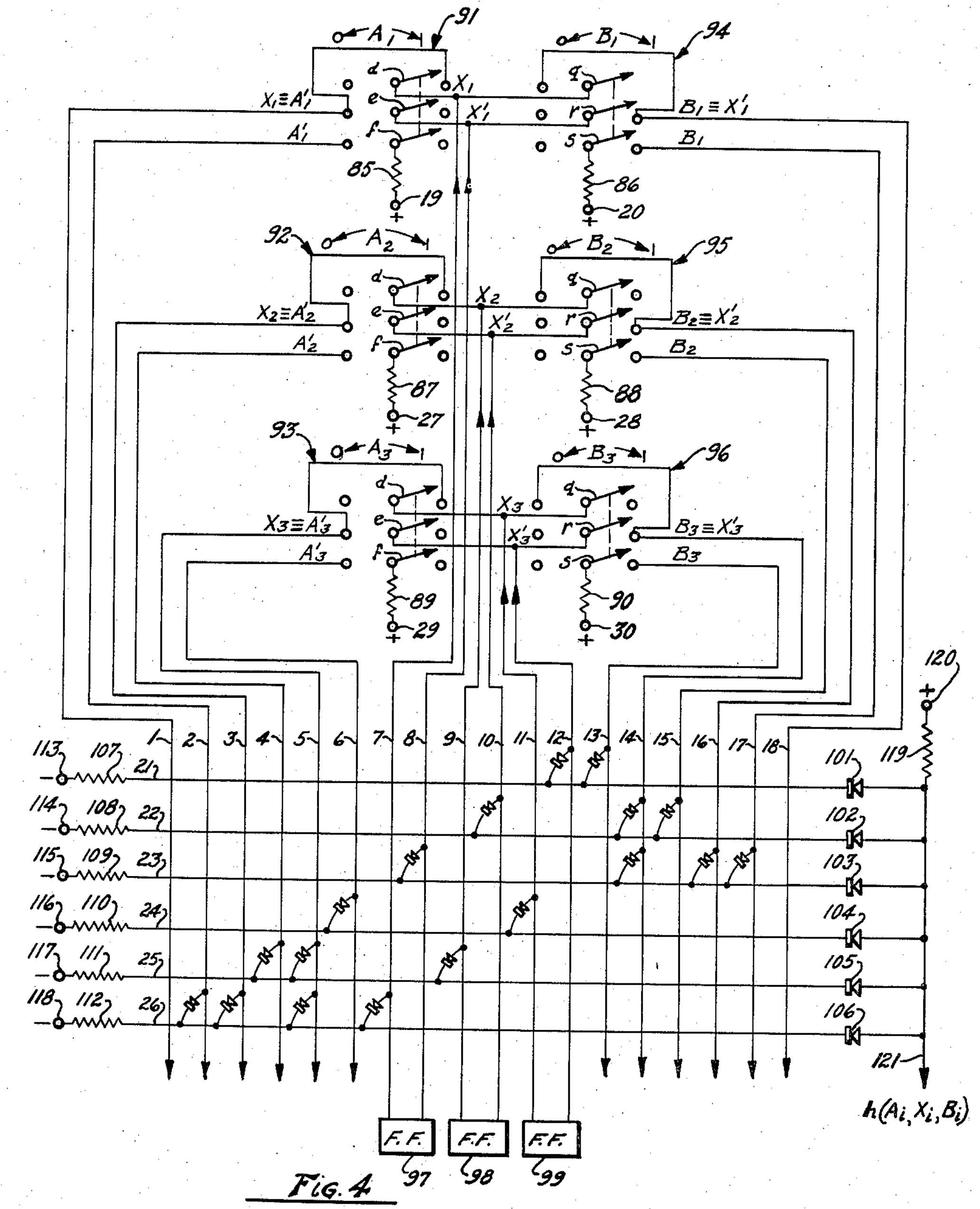
Fig. 4 is a modification of the computer circuit shown in Fig. 1 including switching connections and a diode sensing network for locating a given binary number between two predetermined binary numbers.

It is occasionally necessary, in digital work, to decide whether or not a given binary number X lies within an interval defined by two predetermined binary numbers A and B. In the preferred embodiment of the instant invention, as seen in Fig. 4, binary numbers A and B are set manually into two banks of $n$ switches and which feed into a diode network for sensing whether or not $n$-digit number X satisfies the condition $A<X<B$, as will subsequently be derived. A diode circuit for sensing the relationship $A\leqslant X\leqslant B$ will then be derived.

Let the $n$-digit binary numbers A, X, B, be expressed in the form:

$$\sum_{i=1}^{n} A_i 2^{i-1},\ \sum_{i=1}^{n} X_i 2^{i-1},\ \sum_{i=1}^{n} B_i 2^{i-1}$$

A propositional function $g(A_i, X_i, B_i)$, $i=1, 2 \ldots, n$, taking for example, the $3n$ digits of A, X and B as values, it is desired to fulfill the condition $g(A_i, X_i, B_i)=1$, if and only if $A<X<B$. When function $g$ is explicitly defined, a diode network may be indicated for its realization.

Suppose $f(A_i, X_i)=1$, if and only if $A<X$. Then $f(X_i, B_i)=1$, if and only if $X<B$, and $$g(A_i, X_i, B_i)=f(A_i, X_i)\cdot f(X_i, B_i) \qquad (1)$$

The determination of the nature of function "$g$" is thus reduced to the simpler problem of finding the function "$f$."

One binary number is less than another binary number if, and only if, at least one of their digits standing in a position which may be designated as $k$, are unequal and all the remaining digits, of higher order, of said binary numbers are equal. That is, $A<X$ if and only if, for some value of $k$ such that $k\geqq 1$, $$A_i=X_i,\ i=n,\ n-1,\ n-2 \ldots, k+1, \text{ and } A_k<X_k \qquad (2)$$

In terms of Equation 2 an explicit statement of inequality follows:

$$A<X \text{ if, and only if,}\left.\begin{array}{l} A_n<X_n \\ \text{or} \\ (A_n=X_n) \text{ and } (A_{n-1}<X_{n-1}) \\ \text{or} \\ (A_n=X_n) \text{ and } (A_{n-1}=X_{n-1}) \text{ and } (A_{n-2}<X_{n-2}) \\ \cdot \\ \text{or } \cdot \\ \cdot \\ (A_n=X_n) \text{ and} \ldots \text{and } (A_2=X_2) \text{ and } (A_1<X_1) \end{array}\right\} (3)$$

Propositions of the form "$A_k<X_k$" and "$A_i=X_i$," are not readily translatable into diode circuitry because they are of a type logically different from the conventional "and" and "or" circuits. The relationships in the subsequently defined Equation 4 supply the missing step and avoid some of the related technical difficulties.

$$\left.\begin{array}{l} A'_iX'_i+A_iX_i=1, \text{ if and only if } A_i=X_i \\ A'_k\cdot X_k=1, \text{ if and only if } A_k<X_k \end{array}\right\} \qquad (4)$$

where $A'_i=1$, $X'_i=1$, if and only if $A_i=0$, $X_i=0$, and conversely. That is, $A'_1$ designates the complement of $A_1$, and $X'_1$ is the complement of $X_1$. In addition, it is obviously understood that $A_1$ may be expressed as a function of its binary complement $A'_1$.

In Equation 4, and in what follows, logical multiplication is read as an "and" circuit and logical addition is construed as an "or" circuit. The conditions in Equation 3 may now be restated in terms of Equation 4 to define $f(A_i, X_i)$, $n \geqq i \geqq 1$, writing "$A_i \equiv X_i$" instead of $$"A'_iX'_i + A_iX_i"$$

for brevity:

$$\left.\begin{aligned} f(A_i, X_i) = {} & A'_nX_n \\ & + (A_n \equiv X_n)(A'_{n-1}X_{n-1}) \\ & + (A_n \equiv X_n)(A_{n-1} \equiv X_{n-1})(A'_{n-2}X_{n-2}) \\ & \cdot \\ & \cdot \\ & \cdot \\ & + (A_n \equiv X_n)(A_{n-1} \equiv X_{n-1}) \ldots (A_2 \equiv X_2)(A'_1X_1) \end{aligned}\right\} \quad (5)$$

The aforestated expression purposely has not been factored in order that the diode levels may be indicatively grouped. A circuit comprising such diode levels is constructable by the formula $$D = 2n + \sum_{i=1}^{n} i$$

where D equals the number of diodes required. For example, as shown in the circuit for sensing the relationship $A < X$ in Fig. 1, $n=4$ and $$D = 2.4 + \sum_{1}^{4} i$$

or $D=18$ diodes.

It is noted that $f(X_1, B_1)$ is similar to $f(A_1, X_1)$, and it is seen from the function $$g(A_i, X_i, B_i) = f(A_i, K_i) \cdot f(X_i, B_i)$$

that two diodes are required in an additional voltage level. The functions $A_i \equiv X_i$, or $A'_iX'_i = 1$, are obtained by wiring two sets of contacts on each switch $A_i$. A third set of contacts is needed to supply $A'_i$ (see Fig. 1).

The type of circuit defined by Equations 1 and 5, having three voltage levels, may not be suited for high speed operation. A two voltage level circuit will now be derived to sense the condition $$A \leqq X \leqq B \quad (6)$$

If $f(B_i, X_i) = 0$, or $B = X$, then B is not less than X, and conversely. Hence $f'(B_i, X_i) = 1$ if and only if $X \leqq B$, $f'(X_i, A_i) = 1$ if and only if $A \leqq X$, and we may define the function $$h(A_i, X_i, B_i) = f'(B_i, X_i) \cdot f'(X_i, A_i) \quad (7)$$

a function equal to "1" if and only if Equation 6 holds. Such a relationship is readily transformable to binary diode circuitry, as shown in the embodiment of Fig. 4, wherein a "1" output signal will indicate that the relationship $A \leqq X \leqq B$ is satisfied.

The function $f'(B_i, X_i)$ may be written directly from Equation 5 by reference to De Morgan's rule of logical algebra, wherein $(\alpha \cdot \beta)' = \alpha' + \beta'$, for all values of $\alpha$ and $\beta$ which are propositional functions. Thus the inverse of Equation 5, with $B_i$ substituted for $A_i$, yields $$\left.\begin{aligned} f'(B_i, X_i) = {} & (B_n + X'_n) \\ & [(B_n \equiv X'_n) + B_{n-1} + X'_{n-1}] \\ & [(B_n \equiv X'_n) + (B_{n-1} \equiv X'_{n-1}) + B_{n-2} + X'_{n-2}] \\ & \cdot \\ & \cdot \\ & [(B_n \equiv X'_n) + \ldots + B_2 \equiv X'_2) + B_1 + X'_1] \end{aligned}\right\} \quad (8)$$

where $B_i \equiv X'_i = B'_iX_i + B_iX'_i = (B_i \equiv X_i)'$.

Since the major terms in Equation 8 are logically multiplied together, and since Equation 7 is also a product function, one level of "and" diodes suffices for both purposes.

Figures 2, 5:
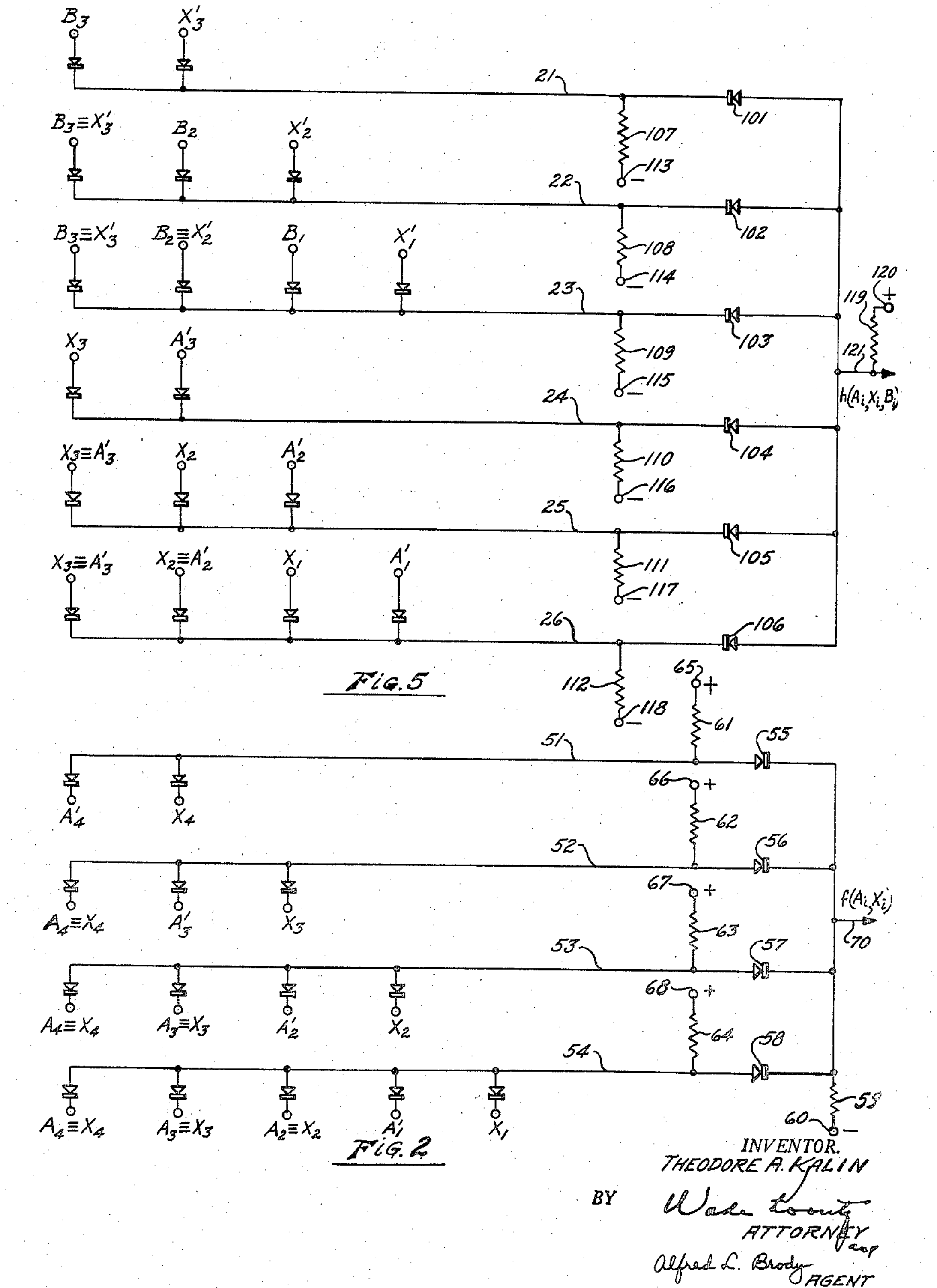
Fig. 2 is a logical sequence arrangement of the diode sensing network of Fig. 1.
Fig. 5 is a logical sequence arrangement of the diode sensing network of Fig. 4.
Figure 6:
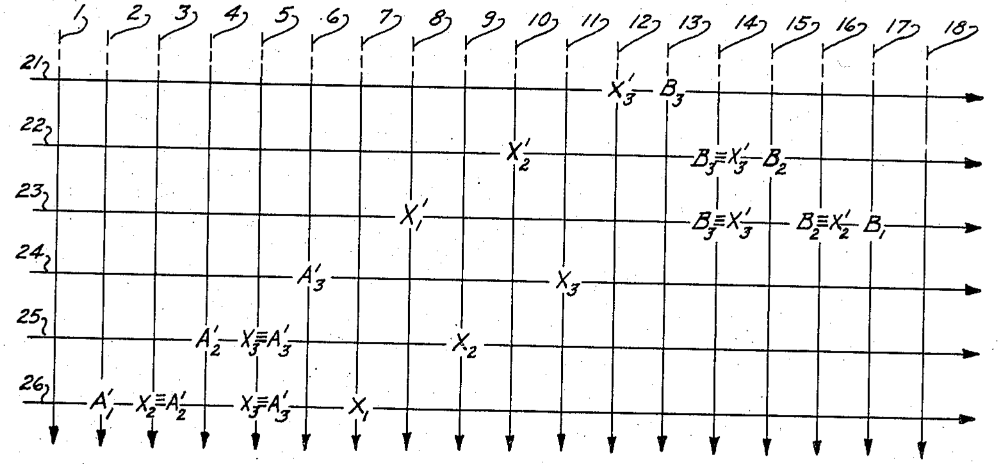
Fig. 6 is a schematic matrix arrangement of the sensing network of Fig. 4.

In the embodiment of Figs. 4, 5 and 6, a circuit for sensing the relationship of $A \leqq X \leqq B$ where the $n$-digit number is equal to 3, is shown.

Figure 1:
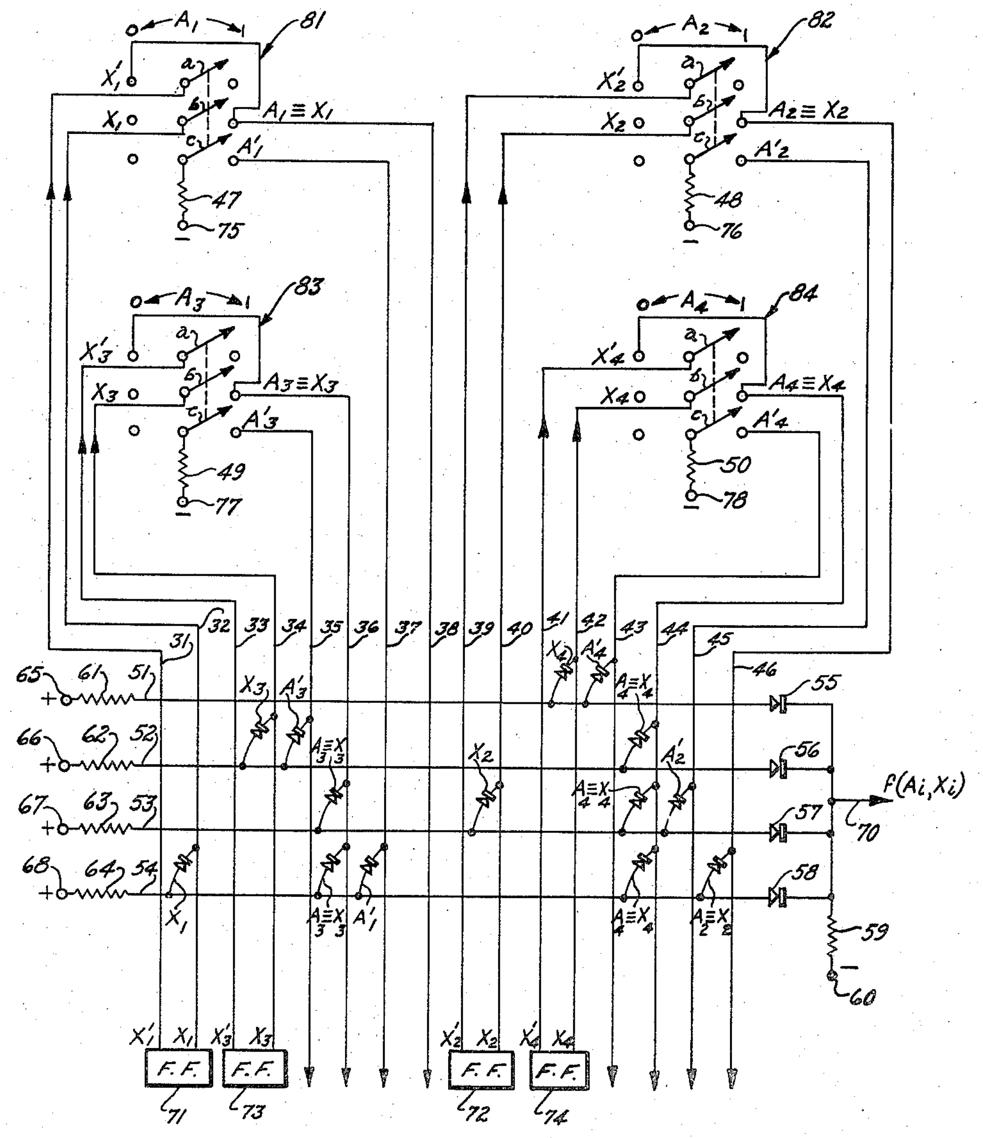
Fig. 1 is a computer circuit including switching connections and a diode sensing network for locating a given binary number with respect to a predetermined binary number.
Figure 3:
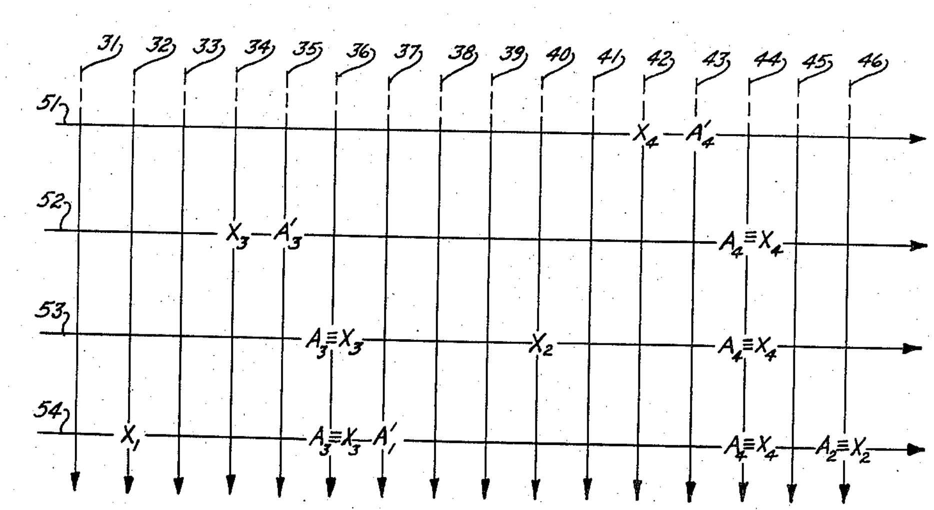
Fig. 3 is a schematic matrix arrangement of a portion of the sensing network of Fig. 1.

The simpler embodiment of the present invention, as shown in Figs. 1, 2 and 3 will give an output only if $A < X$. For $A \geqq X$ no output will be present. The circuit as shown is designed to handle four digit binary numbers. Thus the four binary digits $A_1$, $A_2$, $A_3$ and $A_4$, collectively represent the number A, while the four binary digits $X_1$, $X_2$, $X_3$ and $X_4$ collectively designate the number X.

Triple-throw double pole switch 81 is, in effect, a manually controlled "or" circuit. The arms *a*, *b* and *c* of switch 81, are gang connected so as to pivot as a unit to selectively engage left or right contact points. In the left position, indicative of $A_1=0$, a voltage from "flip-flop" 71, representative of the binary value "1" and designating the complementing digit $X'_1$, is fed to either the central contact of arm *a* to left contact and to eventually feed a voltage indicative of binary value "1" to the diode network, or said binary value "1" which designates digit $X_1$, is fed to the central contact of arm *b* and to its "dead" left contact point. It is noted that arm *c* in its left position, also engages its "dead" contact point. The left position of arm *c* of switch 81, will enable a voltage of binary value "1" to be fed through the diode designating $A'_1$, to the "and" circuit component comprising line 54.

In the right position, indicative of $A_1=1$, arm *a* engages its "dead" contact point, arm *b* engages its right contact and transmits a voltage indicative of a binary value "1" to the diode network designating the relationship $A_1 \equiv X_1$, if and only if the central contact point of arm *b* receives a voltage of a binary value "1" representative of $X_1$ from "flip-flop" 71, and arm *c* engages its right contact to feed voltage representative of a binary value of "0" which designates complementary digit $A'_1$. In other words, the relatively negative voltage source 75 diverts the relatively positive voltage source 68 through the diode designated as $A'_1$ from the "and" circuit component of line 54, so that $A'_1=0$, for the right position of arm *c*.

It is noted that the output, if any, representative of the relationship, $A_1 \equiv X_1$, actually is not made use of in the diode network of the embodiment of Fig. 1; however, said relationship is shown for purposes of symmetry or in case additional digits are added to said embodiment (e.g. $A_5$, $X_5$).

Switches 82, 83 and 84 operate in a manner similar to switch 81, wherein the input of either $X'_2$ or $X_2$, $X'_3$ or $X_3$ and $X'_4$ or $X_4$, from "flip-flops" 72, 73 and 74, may or may not transmit voltages representative of the relationships $A_2 \equiv X_2$ and/or $A'_2$, $A_3 \equiv X_3$ and/or $A'_3$ and $A_4 \equiv X_4$ and/or $A'_4$, respectively, to the diode network.

Relatively negative voltage sources 76, 77 and 78 and load resistors 48, 49 and 50 complete the switching circuitry of switches 82, 83 and 84 to enable voltages of binary value "1" to be generated and transmitted to the diode network representative of the relationship $A'_2$, $A'_3$ and/or $A'_4$. As seen in Fig. 2, the diodes disposed vertically and connected to horizontal lines 51, 52, 53 and 54 each comprises a separate "and" circuit. That is, each of the diodes controlled in accordance with the values of a particular level must be fed simultaneously by a high voltage in order that the voltage of said particular level may be high enough to yield an output. Thus, on the top or fourth level of line 51, both the inputs to the diodes designated as $A'_4$ and $X_4$, each simultaneously must be fed from sources comprising TTDP manual switch 84 and "flip-flop" 74, respectively, with a high voltage indicative of the binary value "1," in order that the voltage in line 51, to the left of diode 55 may rise to such a value. It is noted that in said top fourth level, a relatively positive voltage source 65 and load resistor 61 complete the conventional components of the typical "and" circuit. Similarly, on the second level of line 52 the inputs to the diodes, designated as $A_4 \equiv X_4$, $A'_3$ and $X_3$ must each simultaneously be fed with high voltage, in order that the third level may rise to a high voltage corresponding to a "1" output. Accordingly, manual switches 82, 83 and 84, when each are in their "1" binary positions, are indicative of the binary digits $A_2$, $A_3$ and $A_4$, respectively, and each will generate a high voltage indicative of binary value "1" to the selective diodes of the diode network representative of the relationships $A_2 \equiv X_2$ and $A'_2$, $A_3 \equiv X_3$ and $A'_3$, and $A_4 \equiv X_4$ and $A'_4$, respectively. In addition, the voltage levels of lines 52, 53 and 54, are provided with relatively positive voltage sources 66, 67 and 68 and load resistors 62, 63 and 64, respectively, which complete the conventional "and" circuit for these different levels. Voltages indicative of a binary "1" for the digits $X'_1$ or $X$, $X'_2$ or $X_2$, $X'_3$ or $X_3$, and $X'_4$ or $X_4$, are generated, respectively, from "flip-flops" 71, 72, 73 and 74.

The output, if any, from each level, represented by lines 51, 52, 53 and 54 are fed into separate diodes 55, 56, 57 and 58, respectively. A relatively negative voltage 60 and a load resistor 59 is connected to the output of each diode 55, 56, 57 and 58, positioned parallel to one another, to complete a conventional "or" circuit, whose output, if any at common output lead 70 is a function of $f(A_i, X_i)$ and indicates whether $A<X$.

This is an inclusive "or" circuit in that any one or more of the levels having a high enough voltage will give an output. It is not an exclusive "or" circuit wherein only one or the other of the levels is capable of giving an output. That is, because of the polarity of the "or" diodes, if any one of the levels rises to a high voltage, there will be a high voltage appearing across the output to indicate the binary value "1."

In Fig. 3, a matrix is shown to schematically illustrate the placement of the diodes of Fig. 1 and indicate the relationships between numbers A and X, as determined by the intersection of vertical lines 31 to 46 and horizontal lines 51 to 54.

In order to explain the operation of the circuit of the embodiment of Fig. 1, it is necessary to further clarify and define two relationships.

The first of these is the complement of a binary number. This number has the same number of digits as the original binary number, but wherever a binary value "1" appears in the original a binary value "0" appears in its complement, and wherever an "0" appears in the original, a "1" appears in its complement. For example, if a four digit binary number, A, is 1101, then its complement, A', is 0010.

The second relationship which must be defined is symbolized by $A_i \equiv X_i$, where $A_i$ and $X_i$ are the $i$th digits of binary numbers A and X. It can be shown, by logical algebra, that in order for $A_i = X_i$, the equation $$A_i \cdot X_i + A'_i \cdot X'_i = 1$$

must be true. In this equation multiplication can be read as representative of an "and" circuit and summation as representative of an "or" circuit. It is a theorem of logical algebra that 1.1=1, but 1.0 or 0.0=0. Thus, this equation indicates that if $A_i = X_i$, then either $A_i \cdot X_i$ must be equal to 1, or (if both $A_i$ and $X_i$ are equal to 0), $A'_i \cdot X'_i$ is equal to 1. The form $A_i \equiv X_i$, therefore, is used as a convenient shorthand to designate the relationship $A_i \cdot X_i + A_i \cdot X'_i = 1$, when $A_i = X_i$. The switches 81, 82, 83 and 84, each show the circuitry for generating the binary digits of the relationship $A_i \equiv X_i$.

There are four possible relationships in the case of each digit, that is, each digit of $X_i$ and each digit of $A_i$ can take the two possible values of "0" or "1." The problem of determining if $A<X$, is solved if the fourth or the highest (as the case may be) digit $X_4=1$ and $A_4=0$. It follows that if $A_4=0$, then its complement $A'_4=1$, and since $X_4=1$ the condition is satisfied whereby the highest level of the circuit of Fig. 1 will give an output. The absence of this condition does not, however, uniquely determine that $A \geqslant X$.

If $X_4 = A_4$, but one of the lower order digits of X is greater than the corresponding digit of A (e.g. $A_3 < X_3$), then $A<X$. Thus, if $A_4 = X_4$, then we should determine whether or not the third digits $X_3$ and $A'_3$ are both equal to "1." The condition that $A_4 = X_4$ is determined by the function previously described and written $A_4 \equiv X_4$. Therefore, when the function $A_4 \equiv X_4$ is satisfied, a voltage of binary value "1" is fed into a diode of the "and" circuit of the third level of line 52 together with the diodes responsive to the presence or absence of a binary value "1" of the digits $X_3$ and $A'_3$. It is obvious that in such a circuit an output is generated only and if all inputs of each of the relationships $A_4 \equiv X_4$, $X_3$ and $A'_3$ is "1." If not, the relationship of whether or not $A<X$ must be successively determined in the second level of line 53 or, if necessary, the first level of line 54.

For the one possibility of the fourth digit not discussed ($A_4=1$, $X_4=0$), no output will occur from the top or fourth level of line 51, because both diodes representative of the relationship $A'_4$ and $X_4$ will each be fed with a low voltage corresponding to a binary value "0." Similarly, no output can occur from each of the lower levels of lines 52, 53 and 54, since $A_4 \neq X_4$, and each of said lower levels have an "and" input fed by the signal indicative of the function $A_4 \equiv X_4$. This condition ($A_4=1$, $X_4=0$), which will not give any output to designate the relationship $A<X$ will, therefore, uniquely indicate that $A>X$, a condition under which no output is transmitted to line 70. The same reasoning holds true for the digits of the lower levels of lines 52, 53 and 54.

While the circuit of Figs. 1 to 3 is useful for some purposes, it may be more useful to have a circuit which will sense whether X lies in a region bounded by the two numbers A and B. Such a circuit is shown in Fig. 4 and is designed for three digit binary numbers. The upper three voltage levels of this circuit, as found in lines 21, 22 and 23, collectively yield an output when $X \leqq B$. It will be noted that the inputs to the various levels of lines 21, 22 and 13 in this circuit, are connected in an "or" configuration, as contrasted with the "and" configuration of the embodiment of Fig. 1. It is noted also that the diodes of each of said levels in the embodiment of Fig. 4, arranged so that the positive side of each diode in each of said levels, is connected to lines 21, 22 and 23, whereas in the embodiment of Fig. 1 the negative side of the diodes are secured to each of the levels. Furthermore, in lines 21, 22 and 23, relatively negative voltage sources 113, 114 and 115, and load resistors 107, 108 and 109, respectively, complete the components of the conventional "or" circuit in each of the levels. In addition, all the levels of lines 21, 22 and 23 are connected to a common output line 121 through the intermediary of an "and" circuit. Such an "and" circuit comprises diodes 101, 102 and 103, each of which receives the output, if any, from each of the "or" circuits in lines 21, 22 and 23, and a relatively positive voltage source 120, which is fed through a load resistor 119 to line 121. Thus, each level must generate an output before an output may be generated and indicated in line 121 for the total circuit.

In the operation of the circuit, let us first consider the conditions where $X \leqq B$, when $B_3=1$ and $X_3=0$, or if $B_3 = X'_3$. These conditions are specified by arranging the circuits to give an output if $B_3=1$, or if $X'_3=1$ (for the condition when $B_3=X_3=0$). Therefore, these are the inputs to the "or" circuit on the highest level of line 21.

In addition to the highest digit this same condition must exist for the lower order digits. However, if $B_3=1$ and $X_3=0$, the circuit should give an output regardless of the relative magnitude of lower order digits of numbers X and B. This is accomplished by the use of the inputs to the "or" circuits of each level of the relationship designated as $B_3 \equiv X'_3$. Such a relationship as $B_3 \equiv X'_3$, is a shorthand form to indicate that when $B_3 = X'_3$, the logical algebraic relationship of $B_3X'_3 + B'_3X_3 = 1$, will hold true. It is obvious that $B_3$ will only be equal to $X'_3$, when $B_3 = 1$ and $X_3 = 0$, or when $B_3 = 0$ and $X_3 = 1$. It is noted that in the condition where $B_3 = 0$ and $X_3 = 1$, no output will be generated from the "or" circuit of the level of line 21, and since the "and" circuit requires outputs from all levels there will be no output produced at line 121 to indicate the relationship $X < B$.

The same reasoning applies also for the second digit and accounts for the presence of the input designated as $B_2 \equiv X'_2$ of the level of line 23. The upper three levels of lines 21, 22 and 23 of this circuit, therefore, will give an output if and only if $X \leq B$.

If a similar circuit is designed replacing B by X and X by A, two circuits may be arranged to feed into a common "and" circuit so that an output may be obtained only as $A \leq X$ and $X \leq B$ or $A \leq X \leq B$. As seen in Figs. 4 and 5, such a circuit including three levels of diodes comprises an "or" circuit in each of lines 24, 25 and 26. The levels of lines 24, 25 and 26 includes the conventional components of relatively negative voltage sources 116, 117 and 118 and load resistors 110, 111 and 112, respectively. The outputs of all the levels, if any, are fed into diodes 101, 102, 103, 104, 105 and 106 of the "and" circuit. If an output is forthcoming from all the levels, an output will be indicated in line 121.

In addition to the above-described features, Fig. 4 also illustrates a switching arrangement for generating the two functions of $X_i \equiv A'_i$ and $B_i \equiv X'_i$, as required in the diode network. Triple-throw double-pole switch 91 will generate a voltage representative of the binary value "1" for the digit $A_1$ of number A, when said switch 91 is in its extreme right position, while said switch will indicate a binary value of "0," when in an extreme left position.

When the arms of switch 91 are in their right position, arm *d* or arm *e* will complete a circuit to produce a voltage indicative of binary value "1" for either the digit $X_1$ or its complement $X'_1$, respectively, as determined by the output from "flip-flop" 97. Arm *f*, in its right position, rests on a "dead" contact. If the binary value "1" is indicated for $X_1$, an output indicative of the function $X_1 \equiv A'_1$, will be transmitted to the diode network through line 1. In the particular arrangement as shown, however, the output indicative of $X_1 \equiv A'_1$, is not actually used in the diode network but is shown for purposes of symmetry or in case additional digits are added to the circuitry (e.g. the digits $A_4$, $X_4$, $B_4$).

When the arms of switch 91 are in the left position arm *d* will engage a dead contact and arm *e* may or may not transmit a voltage from $X'_1$, indicative of a binary value "1," to generate a voltage corresponding to a binary value "1" and representative of the function $X_1 \equiv A'_1$ to the diode network. A relatively positive voltage source 19 and a load resistor 85 will cause a voltage indicative of binary value "1," representing the function $A'_1$, to be transmitted to the diode network at the intersection of lines 2 and 26.

Similarly, switches 92 and 93, selectively control the binary values of $A_1$ and $A_2$ and receive voltages indicative of the binary values "1," through lines 9, 10, 11 and 12 from "flip-flops" 98 and 99 and representative of either the digits $X_2$ or $X'_2$, and digits $X_3$ or $X'_3$, respectively. Also, similarly as stated in the operation of switch 91, the functions $X_2 \equiv A'_2$, $A'_2$, $X_3 \equiv A'_3$ and $A'_3$ are transmitted to the diode network through lines 3, 4, 5 and 6. As described in the operation of switch 91, when either or both of switches 92 and 93 are in their left positions relatively positive voltage sources 27 and 29 and load resistors 87 and 89 will cause voltages of binary value "1" to indicate the function $A'_2$ and $A'_3$, respectively, in the diode network.

Switch 94 operates similarly to switch 91 and to selectively indicate $B_1$ and receives voltages indicative of the binary value "1" from "flip-flop" 97 to designate either the function $X_1$ or $X'_1$.

When the arms *q*, *r* and *s* of switch 94 are in their left positions, indicative of $B_1 = 0$, arm *q* completes a circuit to indicate the function $B_1 \equiv X'_1$, if the "flip-flop" 97 is in such a state, so that $X_1 = 1$, and arms *r* and *s* in their left positions engage "dead" contact points.

When arms *q*, *r* and *s* of switch 94 are in their right positions, indicative of $B_1 = 1$, arm *q* engages a dead contact point, arm *r* completes a circuit to indicate the function $B_1 \equiv X'_1$, in the diode network if the "flip-flop" 97 is in such a state so that $X'_1 = 1$, and arm *s* in its right position will transmit a voltage indicative of $B_1 = 1$, to the diode network as generated by relatively positive voltage source 20 and load resistor 86.

Similarly, switches 95 and 96 receive voltages from "flip-flops" 98 and 99, indicative of binary value "1" and representative of either $X_2$ or $X'_2$ and either $X_3$ or $X'_3$, respectively. Relatively positive voltage sources 28 and 30 and resistors 88 and 90, of switches 95 and 96, respectively, have the corresponding function of voltage source 20 and resistor 86 in switch 94, to generate the functions $B_2 = 1$ and $B_3 = 1$ to the diode network. The relationships $B_2 \equiv X'_2$ and $B_3 \equiv X'_3$ are or are not indicated in the diode network in a manner similar to the arrangement as described for switch 94. The logic applicable to the above-described functional operation is symbolically represented in Fig. 5.

Fig. 6 is a matrix schematically showing of the placement of the diodes in the diode network of the embodiment of Fig. 4 and representative of the digits of the numbers A, X and B, at the intersections of vertical lines 1 to 18 with respect to horizontal lines 21 to 26.

It should be noted that in place of the manual switches used for indicating the digits of A and B, as well as the diode switches of the diode network (e.g. diode 55), any type of two-valued switching elements, such as relays, gas tubes, or vacuum tubes, could be used to instrument a circuit of this type.

Furthermore, it should be emphasized that while the embodiments of the present invention have been described in terms of 4 and 3 digit binary numbers, they are not in any sense to be construed as being limited to that number of digits, but obviously may be designed to include as many digits as desired.

Although the invention has been described as relating to specific embodiments, numerous other arrangements will occur to those skilled in the art without departing from the spirit and scope of the invention as claimed.

I claim:

1. In a binary circuit, means for applying a plurality of input signals representative of two numerical binary limits, each of which limits comprises a plurality of digits, and each of which input signals is indicative of a particular one of said digits, means for applying a plurality of input signals indicative of a given binary number, and sensing means responsive to the voltage polarity pattern established by said two signal-applying means for indicating the relationship between the given binary number and the numerical binary limits, said sensing means comprising a diode network including two network portions, the first of said network portions comprising a plurality of digital levels wherein each level is fed by some of said signals indicative of corresponding digits of one of said binary limits, some of said signals being indicative of the corresponding complements of the digits of said given binary number and a third set of signals indicative of the relationship whereby each digit of said one binary limit is equal to the complement of the corresponding digit of the given binary number which is fed to all lower order levels of any particular digit, the second of said diode network portions comprising a plurality of digital levels wherein each level is fed by some of said signals indicative of the complement of corresponding digits of the other of said binary limits, some of said signals being indicative of the corresponding digits of the given binary number and a fourth set of signals indicative of the relationship whereby each complement of the digit of said other binary limit is equal to the corresponding digit of the given binary number and is fed to each of the lower order levels of any particular digit of the binary number or limits.

2. A binary circuit as defined in claim 1, including an

"or" circuit on each level of said diode network and operating conjunctively with said input signals and an "and" circuit fed by the output of each of said "or" circuits and responsive to indicate whether said given binary number lies between said numerical binary limits.

References Cited in the file of this patent

UNITED STATES PATENTS

| | | |
|---|---|---|
| 2,172,328 | Bryce | Sept. 5, 1939 |
| 2,580,768 | Hamilton et al. | Jan. 1, 1952 |
| 2,615,127 | Edwards | Oct. 21, 1952 |
| 2,749,440 | Cartwright | June 5, 1956 |